Aug. 12, 1952    W. F. ANDRICKS    2,606,699
LIQUID DISPENSING DEVICE
Filed June 3, 1948

William F. Andricks
INVENTOR.

BY *Clarence A. O'Brien
and Harvey B. Jacobson*
Attorneys

Patented Aug. 12, 1952

2,606,699

UNITED STATES PATENT OFFICE 2,606,699

LIQUID DISPENSING DEVICE

William F. Andricks, Edison, Ohio

Application June 3, 1948, Serial No. 30,900

1 Claim. (Cl. 222—470)

The invention relates to devices for withdrawing a predetermined amount of material from containers and an object of the invention is to withdraw a measured amount of fluid from a receptacle without the necessity for guess work to determine whether the desired amount has been obtained.

Another object of the invention is to provide a device that may be operated with one hand, leaving the other free to perform other duties, if desired.

A further object of the invention is to reduce unnecessary waste in dispensing predetermined amounts of material, both at home and in commercial establishments, and is of particular value in restaurants or the like where standard portions are desirable both for the benefit of the customer and the owner.

And another object of the invention is to provide a measuring device that is capable of retaining a withdrawn portion of material without spilling until it is ready to be discharged at the point of use.

Still another object of the invention is to provide improved means for removably retaining a cover on the device, and yet another object of the invention is to provide a device that is simple and durable in construction, economic in manufacture, and pleasing in appearance.

Other objects and advantages will become apparent during the course of the following description.

In the accompanying drawings forming a part of this specification and wherein like characters of reference denote like parts throughout, Figure 1 is a side elevation of the invention;

Figure 1:
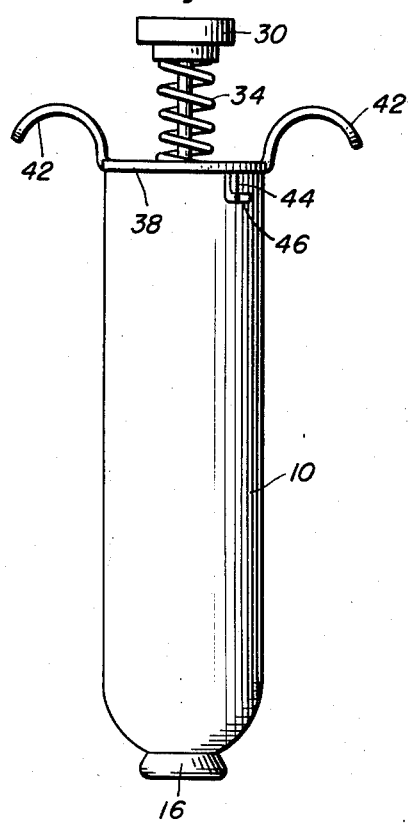

It is desirable in many instances to accurately and quickly withdraw a predetermined amount of material from a container for dispensing purposes. This is particularly true in restaurants where it is desirable to obtain standard portions, eliminating any guess work generally incurred when such devices are not employed, but dependent upon the fallacies of human judgment. A device of this nature is also of value in hospitals, where it is important to know the amount of fluid or powder being used in the administration of drugs and the like. Such standard means are also of value in the home, where the housewife frequently finds the need for such measuring means. This invention, therefore, is adapted to fulfill such need by the provision of efficient yet readily operated measuring means.

Referring to the figures, the numeral 10 represents the cylindrical container into which suitable material is withdrawn. Container 10 is open at the top and tapers on the bottom portion 12 thereof. A large opening or hole 14 is located axially in the bottom tapered portion 12 and forms a valve seat for a bored valve or plug 16. Bore 18 is threaded and extends through the axial vertical length of valve 16. The sides 20 of plug 16 taper in frusto-conical relation to insure a tight fit when it is seated in valve seat 14. An eye or ring 22 is retained in bore 18 by means of threaded shank 24, eye 22 receiving a hook 26 depending from a valve stem or rod 28. Rod 28 extends vertically through container 10 and projects beyond the open top thereof and terminates in a threaded end portion 30 to receive thereon an actuating knob or head 32. A compression spring 34 is mounted on rod 28 and is positioned between the lower surface of head 32 and a cover 36.

Figure 3:
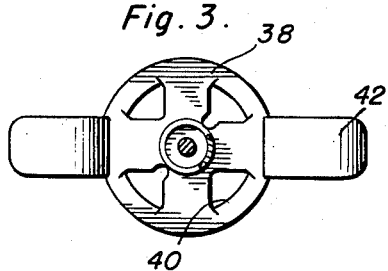
Figure 3 is a plan view of the removable cover.
Figure 4:
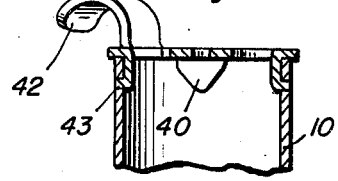
Figure 4 is a fragmentary sectional view of the cover held in position in the container.

As is clearly illustrated in Figure 3, cover 36 includes a circular portion or disk 38 containing a plurality of downstruck lugs 40 for a purpose soon to become apparent. A pair of arcuately curved finger pieces or arms 42 extend from the periphery of the cover 36 and provide the means whereby the operator grasps the device when it is to be put to use. A plurality of lugs 40, struck downwardly from the disk 38, terminate in outwardly turned free end portions 43 which are engageable in the portions 46 of bayonet slots 44 in the upper portion of the container 10.

Figure 2:
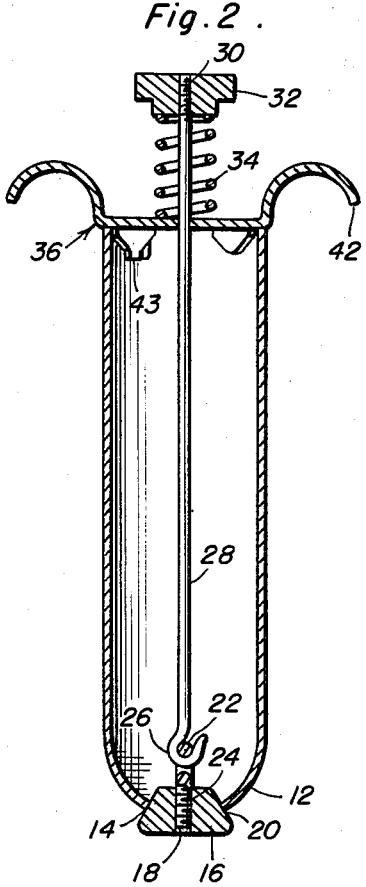
Figure 2 is a vertical longitudinal sectional view of the device shown in Figure 1.

In use, the cylinder 10 is immersed in a suitable fluid container, being retained by the operator's engaging fingers 42. Head 30 is then pressed downwardly against the tension of spring 34, thereby unseating valve 16 from seat 14 to permit the desired material to enter chamber 10. When the desired amount has been withdrawn, head 30 is released, the force of spring 34 causing it to resume the closed position illustrated in Figure 2. The device is then moved to a point of use, where the procedure is repeated, to thereby release any contained material. When it is desired to disassemble the device for cleaning or other purposes, knob 30 is depressed, together with spring 34, thereby projecting hook 26 below valve seat 14, permitting removal of plug 16 and securing eye 22, after which cover 36 is rotated and lifted from baynet slots 44. The device is re-assembled by reversing this procedure. The device may be made of any suitable material, such as metal alloys, tin, aluminum or of plastic, or of resilient material. If desired, a suitable scale depicting the amount of liquid withdrawn could be applied to the inner or outer surface of container 10. Obviously, the size of the device may be varied to suit the particular need.

While a preferred embodiment of the invention has been shown and described, it is to be understood that various changes in size, shape and arrangement of parts may be made without departing from the spirit of the invention or the scope of the appended claim.

Having described the invention, what is claimed as new is:

A dispensing device comprising a tubular container open at its top and including a bottom having an opening therein, said container having bayonet slots in its upper portion, a closure for the container including a disk engageable on the container top, finger pieces projecting from the periphery of the disk, a plurality of spaced lugs struck downwardly from the marginal portion of the disk providing vents therein and engageable in the container for positioning said disk thereon, said lugs terminating in outwardly turned free end portions engageable in the bayonet slots for removably securing the closure on the container, a rod slidable through the closure, a valve on the rod engageable in the opening, and means for operating the rod for opening and closing said valve.

WILLIAM F. ANDRICKS.

REFERENCES CITED

The following references are of record in the file of this patent:

UNITED STATES PATENTS

| Number | Name | Date |
| --- | --- | --- |
| 682,680 | Fribourg | Sept. 17, 1901 |
| 936,366 | Sandoe | Oct. 12, 1909 |
| 1,220,929 | Baltzley | Mar. 27, 1917 |
| 1,222,245 | Schmoller | Apr. 10, 1917 |
| 1,423,322 | Haeseler | July 18, 1922 |
| 1,611,681 | Schling | Dec. 21, 1926 |
| 1,941,751 | Lupo | Jan. 2, 1934 |

FOREIGN PATENTS

| Number | Country | Date |
| --- | --- | --- |
| 22,969 | Great Britain | Nov. 29, 1893 |
| 102,221 | Australia | Oct. 7, 1937 |
| 855,717 | France | Feb. 19, 1940 |